US011466587B2

(12) United States Patent
Hussain et al.

(10) Patent No.: US 11,466,587 B2
(45) Date of Patent: Oct. 11, 2022

(54) CONDITION DETERMINATION OF A GAS TURBINE ENGINE

(71) Applicant: ROLLS-ROYCE plc, London (GB)

(72) Inventors: Zahid M Hussain, Derby (GB); Hugh D Thomas, Derby (GB)

(73) Assignee: ROLLS-ROYCE PLC, London (GB)

(*) Notice: Subject to any disclaimer, the term of this patent is extended or adjusted under 35 U.S.C. 154(b) by 151 days.

(21) Appl. No.: 16/807,532

(22) Filed: Mar. 3, 2020

(65) Prior Publication Data
US 2020/0300111 A1 Sep. 24, 2020

(30) Foreign Application Priority Data

Mar. 18, 2019 (GB) .................................. 1903646

(51) Int. Cl.
*F01D 21/00* (2006.01)
(52) U.S. Cl.
CPC ........ *F01D 21/003* (2013.01); *F05D 2220/32* (2013.01); *F05D 2260/83* (2013.01)
(58) Field of Classification Search
CPC .... F01D 21/003; F01D 17/03; F05D 2260/80; G01N 29/024; G01M 13/028
See application file for complete search history.

(56) References Cited

U.S. PATENT DOCUMENTS

| 4,083,229 A | 4/1978 | Anway |
| 4,669,315 A * | 6/1987 | Sato ....................... G01H 1/003 73/660 |
| 6,711,952 B2 * | 3/2004 | Leamy ................... G01H 1/003 73/579 |
| 7,591,183 B2 | 9/2009 | King |
| 7,942,038 B2 | 5/2011 | Ziminsky et al. |
| 8,655,571 B2 | 2/2014 | Geib et al. |
| 8,752,394 B2 * | 6/2014 | Ernst ..................... F01D 21/003 60/793 |
| 8,869,537 B2 | 10/2014 | Geis et al. |
| 9,032,703 B2 | 5/2015 | Krull et al. |
| 2007/0056376 A1 | 3/2007 | King |
| 2007/0255563 A1 | 11/2007 | Dooley |

(Continued)

FOREIGN PATENT DOCUMENTS

| EP | 1762831 A1 | 3/2007 |
| EP | 1850325 A1 | 10/2007 |

(Continued)

OTHER PUBLICATIONS

Aug. 13, 2020 partial Search Report issued in European Patent Application No. 20157816.8.

(Continued)

*Primary Examiner* — David E Sosnowski
*Assistant Examiner* — Maxime M Adjagbe
(74) *Attorney, Agent, or Firm* — Oliff PLC

(57) ABSTRACT

Disclosed herein is a method of automatically determining an operating condition of at least part of a gas turbine engine 10 for an aircraft, the method comprising: measuring one or more gas pressure waves by a gas pressure detector 401, wherein the gas pressure detector 401 is located in the gas turbine engine 10; and automatically determining, by a computing system, an operating condition of at least part of a gas turbine engine 10 in dependence on an output signal of the gas pressure detector 401.

21 Claims, 7 Drawing Sheets

(56) References Cited

U.S. PATENT DOCUMENTS

| | | | |
|---|---|---|---|
| 2010/0180674 A1* | 7/2010 | Ziminsky | F23N 5/242 |
| | | | 73/112.01 |
| 2011/0079015 A1 | 4/2011 | Geis et al. | |
| 2011/0219741 A1 | 9/2011 | Ernst et al. | |
| 2012/0317990 A1 | 12/2012 | Krull et al. | |
| 2012/0330495 A1 | 12/2012 | Geib et al. | |
| 2016/0238486 A1 | 8/2016 | Bense et al. | |
| 2017/0260871 A1* | 9/2017 | Schmidt | G01N 29/48 |

FOREIGN PATENT DOCUMENTS

| | | |
|---|---|---|
| EP | 2211102 A1 | 7/2010 |
| EP | 2305958 A2 | 4/2011 |
| EP | 2538034 A2 | 12/2012 |
| EP | 2538136 A2 | 12/2012 |
| EP | 2538034 A3 | 12/2015 |
| EP | 3217170 A1 | 9/2017 |

OTHER PUBLICATIONS

Search Report of the Intellectual Property Office of the United Kingdom for GB1903646.6 dated Sep. 5, 2019.
Feb. 18, 2022 Office Action issued in European Patent Application No. 20 157 816.8.

* cited by examiner

CONDITION DETERMINATION OF A GAS TURBINE ENGINE

CROSS-REFERENCE TO RELATED APPLICATIONS

This application claims the benefit of United Kingdom Application No. GB 1903646.6 filed Mar. 18, 2019, the disclosure of which is herein incorporated by reference in its entirety.

TECHNICAL FIELD

The present disclosure relates to techniques for determining the operating condition of at least part of a gas turbine engine for an aircraft. The condition of the gas turbine engine is automatically determined in dependence on the engine's acoustics.

BACKGROUND

There is a general need to improve on known techniques for determining the operating condition of a gas turbine engine for an aircraft.

SUMMARY

According to a first aspect there is provided a method of automatically determining an operating condition of at least part of a gas turbine engine for an aircraft, the method comprising: measuring one or more gas pressure waves by a gas pressure detector, wherein the gas pressure detector is located in the gas turbine engine; and automatically determining, by a computing system, an operating condition of at least part of a gas turbine engine in dependence on an output signal of the gas pressure detector.

The method may comprise measuring one or more gas pressure waves by one or more further gas pressure detectors, wherein the one or more further gas pressure detectors are located in the gas turbine engine; and said automatic determination of an operating condition is also dependent on each output signal from the one or more further the gas pressure detectors.

The method may comprise the computing system performing a Fourier Transform on the output signal of each gas pressure detector to generate a frequency domain version of the output signal.

The method may comprise determining an operating condition by comparing, by the computing system, the output signal of each gas pressure detector with one or more predetermined signals.

The method may comprise said comparison of the output signal of each gas pressure detector with one or more predetermined signals being a comparison of the frequency domain version of each output signal with one or more predetermined signals.

The method may comprise filtering, by the computing system, each output signal of a gas pressure detector.

The method may comprise monitoring, by the computing system, the operating condition of at least part of the gas turbine engine; and detecting, by the computing system, a change in the operating condition.

The method may comprise determining, by the computing system, a type of change of operating condition of at least part of the gas turbine engine in dependence on the comparison.

The method may comprise the determined type of change including a pipe cracking, bursting and/or leaking; and/or the determined type of change comprising the type of pipe that a change has occurred in, such as a cabin air pipe, anti-ice air pipe or handling bleed pipe.

The method may comprise determining the location of the change.

The method may comprise the location of the change being determined in dependence on the difference in time of arrival of gas pressure waves received at two or more of the gas pressure detectors.

The method may comprise each gas pressure detector comprising a plurality of acoustic elements; wherein: each acoustic element has directional sensitivity; and all of the acoustic elements have different orientations such that the gas pressure detector is able to detect gas pressure waves with substantially the same sensitivity in all of the directions that an acoustic element is orientated in.

The method may comprise the acoustic elements being arranged to form a substantially spherical shape such that the sensitivity of the gas pressure detector is substantially the same in all directions around the gas pressure detector.

The method may comprise each acoustic element comprising an acoustic sensor and a housing; and the housing being a horn wave guide.

The method may comprise each gas pressure detector being located in a fire zone of the gas turbine engine.

The method may comprise: impacting the gas turbine engine; wherein the determination of an operating condition of at least part of the gas turbine engine is dependent on one or more gas pressure waves caused by the impact.

According to a second aspect, there is provided a system comprising a gas turbine engine for an aircraft and a computing system, wherein: the gas turbine engine comprises one or more gas pressure wave detectors; and the computing system is arranged to automatically detect an operating condition of at least part of the gas turbine engine according to the method of any preceding claim.

In the second aspect, the gas turbine engine may further comprise: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

In the second aspect, the turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft are arranged to rotate at a higher rotational speed than the first core shaft.

According to a third aspect, there is provided a gas pressure detector comprising: a plurality of acoustic elements, wherein the sensitivity of the detection of a gas pressure wave by each acoustic element is dependent on the direction that the acoustic element is aligned in relative to the direction of propagation of the gas pressure wave; wherein: all of the acoustic elements have different orientations such that the gas pressure detector is able to detect gas pressure waves with substantially the same sensitivity in all of the directions that an acoustic element is orientated in; and the acoustic elements are arranged to form a substantially spherical shape such that the sensitivity of the gas pressure detector is substantially the same in all directions around the gas pressure detector.

In the third aspect, the gas pressure detector each acoustic element may comprise an acoustic sensor and a horn wave guide; the acoustic element is arranged at a first end of the horn wave guide; and a second end of the horn wave guide, that is opposite the first end of the horn wave guide, is shaped as a polygon in a cross-section that is orthogonal to the longitudinal axis of the horn wave guide.

In the third aspect, the acoustic elements may be arranged such that the shape of the gas pressure detector is a dodecahedron.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
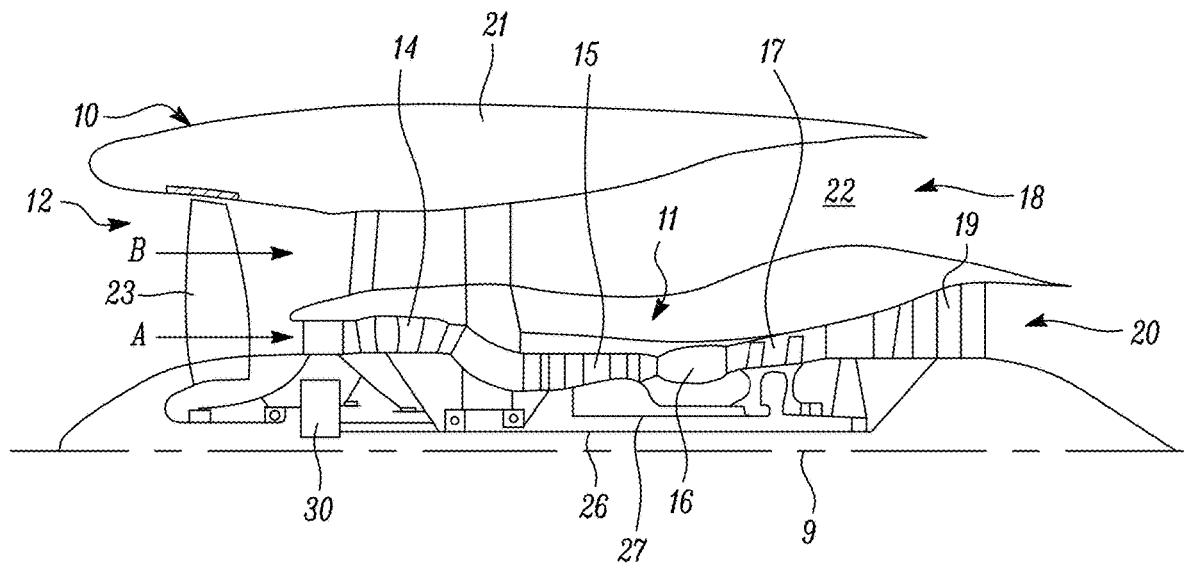
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
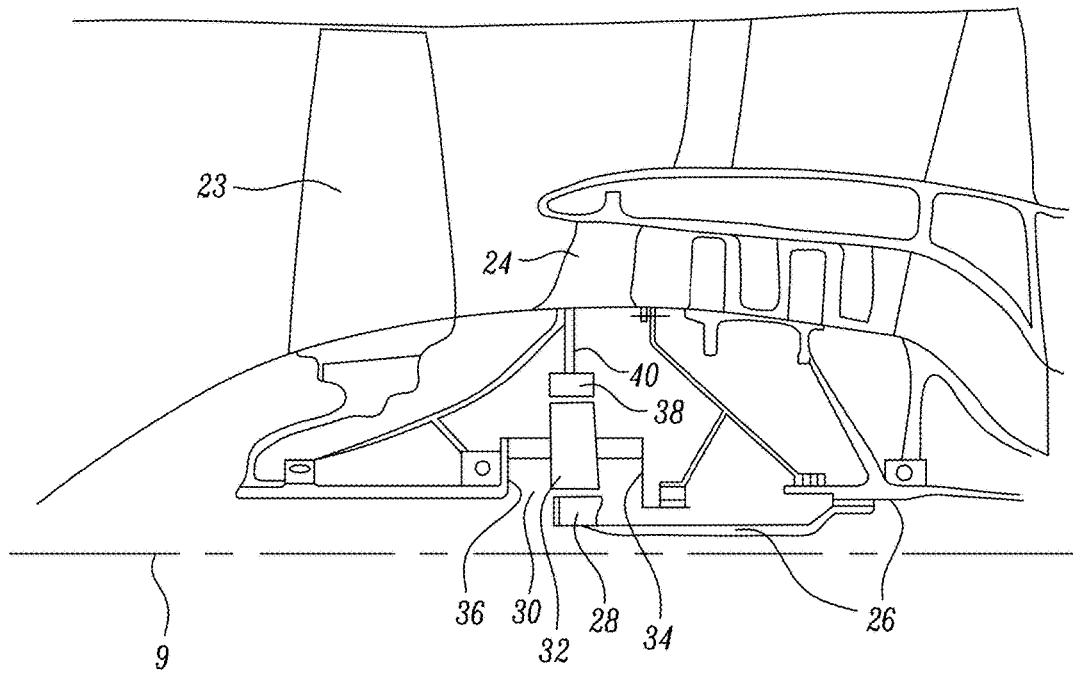
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
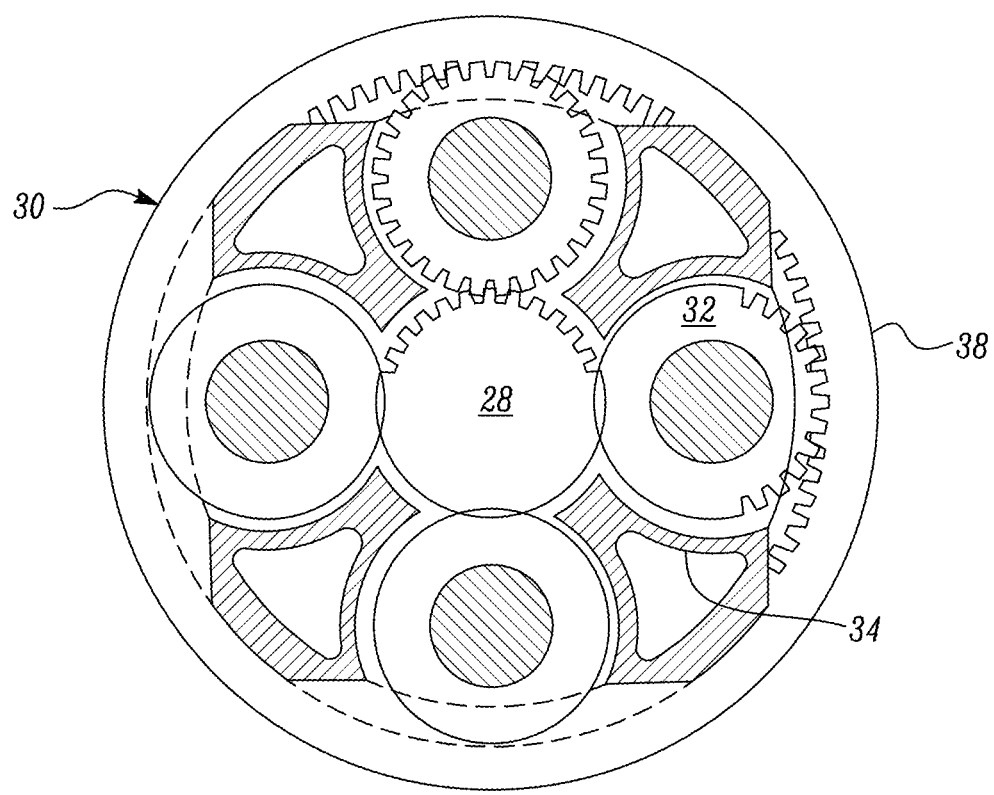
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

A gas turbine engine 10 may comprise a large number of fluid carrying pipes/ducts. The fluids in the pipes can be at high temperatures and/or high pressures.

It is necessary to monitor the operating condition of a gas turbine engine 10 in order to determine if a change in operating condition, in particular a fault condition, has occurred. A fault condition may be, for example, a pipe failure such as a leak occurring or a pipe bursting. If a fault condition occurs then the fault condition should be quickly detected so that appropriate action can be taken.

It is known to detect pipe failures by monitoring the temperature within a gas turbine engine 10. A large burst in a pipe can alter the temperature of the bulk of the gas turbine engine 10. A fault condition can therefore be detected by detecting the temperature change of the bulk. For example, thermometers arranged in the fire zone of the gas turbine engine 10 can detect a fault condition whenever there is an unexpected change of the measured temperatures. However, this known technique is not able to detect a small burst in a pipe that may only cause local effects and does not significantly change the bulk temperature. In addition, a fault cannot be detected until the fault causes a temperature change and this can be a slow process.

Embodiments improve on known techniques by using the acoustics of a gas turbine engine 10 to determine its operating condition. The acoustics, i.e. sound, that the gas turbine engine 10 makes is measured and monitored. Any change of the sound can be used to determine that there has been a change in the operating condition of the gas turbine engine 10.

Embodiments may also include techniques for recognising a type of fault condition that has occurred in dependence on the sound of the gas turbine engine 10.

Embodiments may also include applying techniques for determining the location of a specific sound source. This may be used to determine the location of a fault, such as a burst pipe.

Embodiments are described below with reference to a microphone used to detect sound. However, the techniques of embodiments are not restricted to the sound being a human audible sound and the sound can more generally can be any type of gas pressure wave. The gas may be air and the detected waves air pressure waves. The gas pressure wave may be audible to a human or it may be, for example, ultra-sonic, super-sonic or sub-sonic.

The microphone is also not restricted to being capable of only measuring/recording human audible sounds and may more generally be a gas pressure detector/transducer for detecting the gas pressure waves.

When a gas turbine engine 10 is operating, a failure of a pipe within the gas turbine engine 10 will have an acoustic effect. The acoustic effect may be the direct sound of the pipe wall rupturing and/or fluid passing out of, or into, the pipe through the hole in the pipe wall caused by the rupture.

The acoustic effects can also be used to determine the operating condition of other parts of the system and changes other than burst pipes. For example, the monitored acoustics may include any components of the power plant noise signature such as fan noise, combustor rumble and/or compressor acoustics. Any changes in the measured sound and/or differences to expected values of the measured sound can be used to detect a failure.

The techniques for measuring and monitoring sounds in a gas turbine engine 10 according to embodiments are not restricted to being performed when the gas turbine engine 10 is operating. For example, a sound may be induced in the gas turbine engine 10 by, for example, impacting a part of the gas turbine engine 10. The condition of the gas turbine engine 10 may be determined in dependence on the sound generated in response to the impact.

Figure 4:
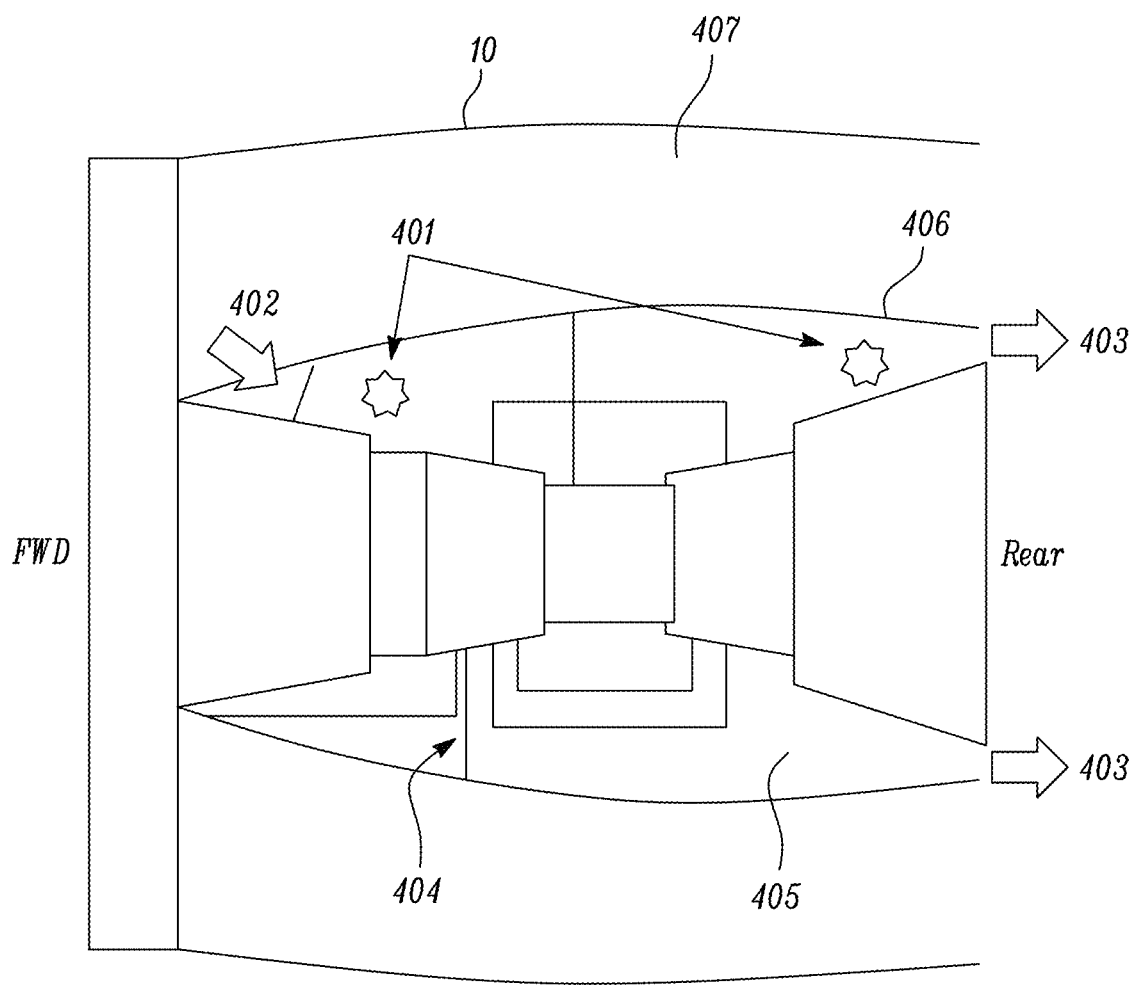
FIG. 4 is a cross-section along the longitudinal axis of a gas turbine engine according to an embodiment.

FIG. 4 is a cross-section along the longitudinal axis of a gas turbine engine 10 according to an embodiment.

As shown in FIG. 4, the gas turbine engine 10 comprises a bulk 406 that is surrounded by a bypass duct 407. Within the bulk 406 is a fire zone 405 that surrounds a core engine. The core engine is also referred to herein as a core 11 or engine core 11. There are one or more inlets 402 to the fire zone 405 and a plurality of outlets 403 from the fire zone 405. Within the bulk 406 are pipes 404 and microphones 401.

Figure 5:
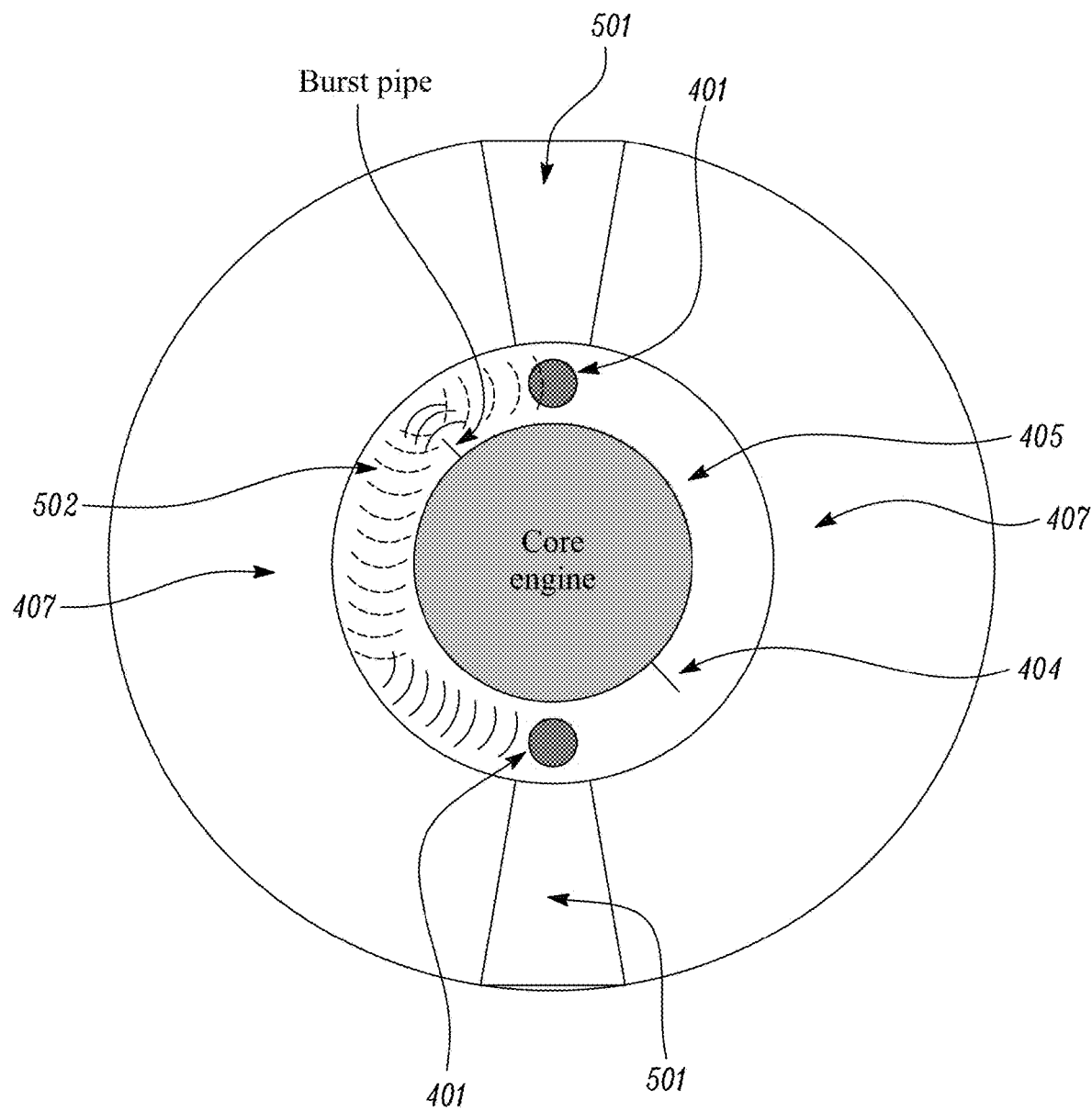
FIG. 5 is a cross-section of a gas turbine engine according to an embodiment, wherein the cross-section is orthogonal to the longitudinal axis of the gas turbine engine.

FIG. 5 is a cross-section of a gas turbine engine 10 according to an embodiment. The cross-section is orthogonal to the longitudinal axis of the gas turbine engine 10.

As shown in FIG. 5, there are splitters/pylons 501 between the bulk 406 and the outer surface of the gas turbine engine 10. Two microphones 401 are positioned in the fire zone 405. The microphones 401 are located on opposite sides of the core engine to each other.

One of the pipes 404 shown in FIG. 5 has burst and this has generated pressure waves 502 that propagate through the gas in the fire zone 405.

Each microphone 401 measures the sound of its environment and outputs an electric signal that is generated in dependence on the measured sound. Each microphone 401 is in communication with a computing system. The output signal from each microphone 401 is transmitted to the computing system.

The computing system may record each signal received from a microphone 401. The computing system can detect changes to the operating condition of a part of the gas turbine engine 10 and/or the entire gas turbine engine 10 by, for each microphone 401, comparing the most recently received signal to previously received signals.

The computing system may analyse each signal that it receives from a microphone 401 by performing a Fourier transform on the signal. The Fourier transform may be, for example, a fast Fourier transform and/or a discrete Fourier transform. The Fourier transform generates a frequency domain representation of the signal. This can be used to determine if the sound comprises components within specific frequency ranges that may be an indication of an incorrect operating condition. For example, a burst pipe may cause super-sonic screech noise to be generated. The burst pipe can then be detected by the computing system whenever frequency components corresponding to super-sonic screech noise are present in a received signal from a microphone 401.

The computing system may determine the operating condition of a part of the gas turbine engine 10 and/or the entire gas turbine engine 10 by comparing the received signal from each microphone 401 to predetermined values/waveforms of signals.

The computing system may store, or have access over a network to, a library of predetermined sound profiles with each sound profile corresponding to one of a plurality of types of fault condition. The fault conditions may include cracked, burst and/or leaking pipes as well as other events that may occur. The computing system may therefore be able to determine, from a comparison of a signal received from a microphone 401 and the sound profiles, the type of fault condition that has occurred. If there are predetermined sound profiles for different types of pipe, the computing system may be able to determine the type of pipe that has failed. For example, cabin air, anti-ice air and handling bleed pipes may all have different sound profiles when they burst and the type of pipe that has burst can therefore be automatically determined by the computing system. The sound profiles may be generated, for example, empirically or through modelling.

The comparison of a signal received by the computing system from a microphone 401 and sound profile may be performed in either the time domain or the frequency domain. If it is performed in the frequency domain then this will allow events that are characterised by the components of their frequency spectrum to be easily compared. Each signal received by the computing system from a microphone 401 may also have other process performed on it, such as filtering operations to prevent aliasing.

The computing system may be able to determine the location and/or direction of a sound source caused by an event occurring, such as a hole occurring in a pipe. If there is only one microphone 401, the location of the sound source may be determined if the microphone 401 is directional and/or if the sound profile is dependent on the distance between the microphone 401 and the sound source.

When more than one microphone 401 is used, as shown in FIG. 5, in addition to the above techniques for a single microphone 401 being used, the difference in phase, i.e. time of arrival, of the sound signal received by each microphone 401 can be used to determine the location of the sound source. This can also assist the determination of the type of event that has occurred.

In the example shown in FIG. 5, the burst pipe is a sound source. A first microphone 401 above the core engine is closer to the burst pipe than a second microphone 401 below the core engine. The first microphone 401 will therefore detect the sound from the sound source before the second microphone 401. The time difference between when the first and second microphones 401 detect the same sound from the sound source can be used to determine the location of the sound source.

Embodiments are not restricted to the microphones 401 being provided in the locations, and with the relative orientations, shown in FIGS. 4 and 5. Embodiments include microphones 401 being provided in other locations and with different relative orientations. For example, in FIG. 5 there may alternatively be three or more microphones 401 in the fire zone 405 around the circumference of the core engine. The number of microphones 401 is also not restricted. For example, there may be nine or more microphones 401. The microphones 401 may also be provided in other parts of the gas turbine engine 10 than the fire zone 405.

Figure 6:
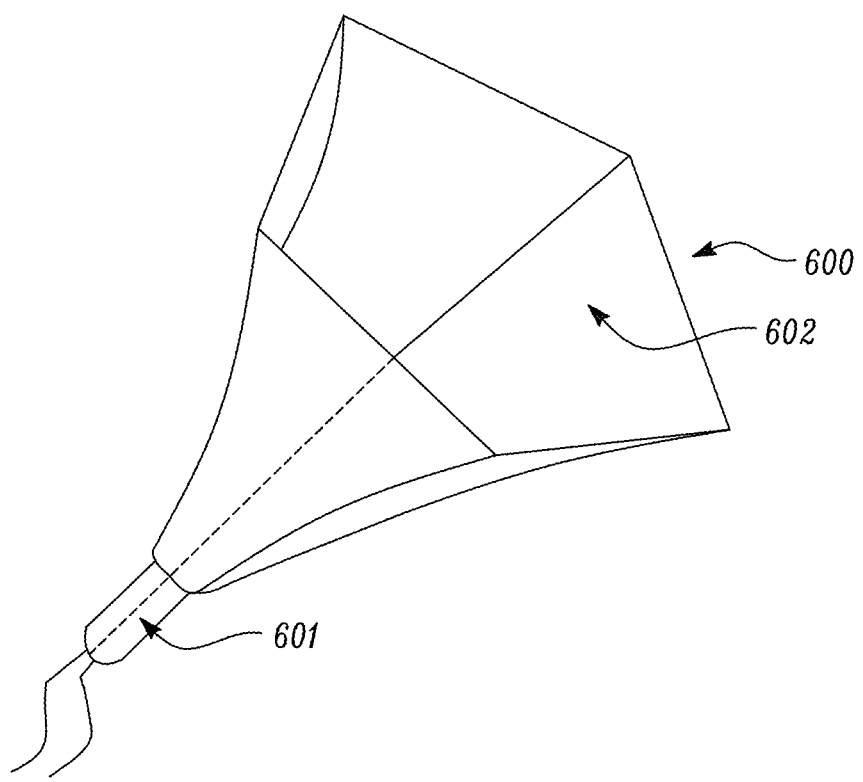
FIG. 6 is an acoustic element according to an embodiment.
Figure 7:
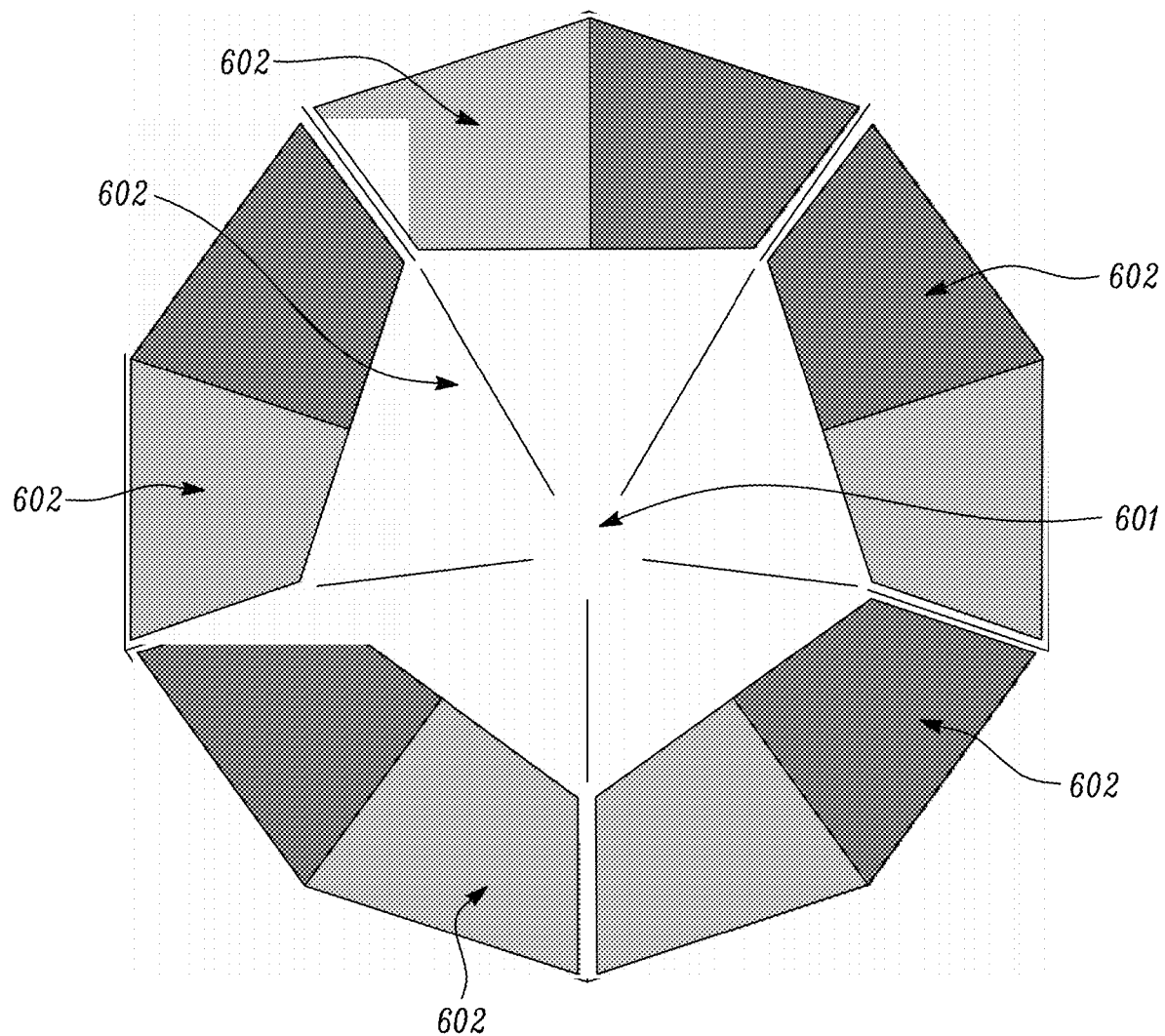
FIG. 7 shows an arrangement of a plurality of acoustic elements according to an embodiment.

Each microphone 401 may comprise one or more acoustic elements 600. As shown in FIG. 6, each acoustic element 600 may comprise an acoustic sensor 601 and a housing 602 of the acoustic sensor 601. The housing 602 both protects the acoustic sensor 601 and provides the acoustic sensor 601 with directional sensitivity. The housing 602 may be a horn waveguide. Each acoustic element 600 has a directional sensitivity to sound that is dependent on the orientation of the horn waveguide. The shape of the cross-section of the end of the horn waveguide may be a regular polygon. A plurality of acoustic elements 600 may be arranged together in a tessellated manner as shown in FIG. 7. The shape formed by combining the acoustic elements 600 may be, for example, be a dodecahedron. The microphone 401 therefore has a substantially spherical shape. The microphone 401 comprises a plurality of acoustic elements 600 with orientations that allow the microphone 401 to detect sounds with substantially the same sensitivity in all directions.

When a microphone 401 comprises a plurality of acoustic elements 600, each acoustic element 600 generates and outputs an electric signal that is generated in dependence on the measured sound. The signal output from the microphone 401 that is transmitted to the computing system may comprise a plurality of signals, with each of the plurality of signals being an output signal from one of the acoustic elements 600 comprised by the microphone 401. Alternatively, the plurality of electric signals from the acoustic elements 600 may be combined with each other at the microphone 401 to generate a single electric signal that is transmitted to the computing system.

Embodiments improve the determination of the operating condition of a gas turbine engine 10 over known techniques based on thermal detection. In particular, a one microphone 401 can detect sound changes over a large region that would require a plurality of thermal detectors, a change of condition can be detected instantly (there is no thermal lag), the location and/or direction of a sound source can be determined, microphones 401 are not expensive and the microphones 401 can detect changes in other parts of the overall system that contribute to the sound profile of the system.

In an alternative to the above-described techniques, one or more of the microphones 401 may be a single horn, or other shape, so that a directional signal is measured.

Embodiments include detecting any type of fault event and well as the general engine health, such as engine degradation and deterioration.

Embodiments may also be integrated with an engine vibration monitoring system and/or thermal detection system.

Figure 8:
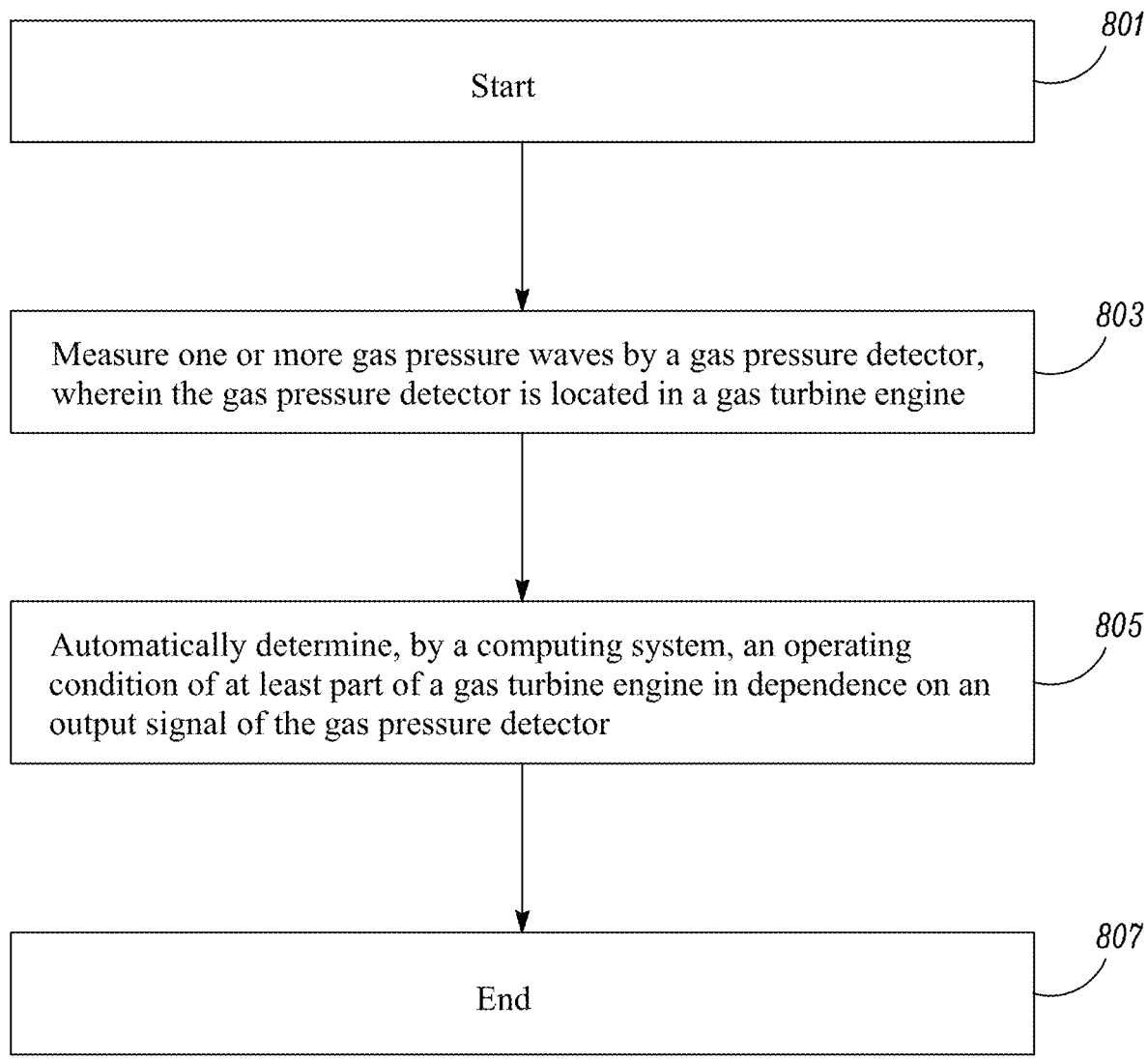
FIG. 8 is a flowchart of a method according to an embodiment.

FIG. 8 is a flowchart of a process for automatically determining an operating condition of at least part of a gas turbine engine 10 for an aircraft according to an embodiment.

In step 801, the process begins.

In step 803, one or more gas pressure waves are measured by a gas pressure detector 401, wherein the gas pressure detector 401 is located in the gas turbine engine 10.

In step 805, a computing system automatically determines an operating condition of at least part of a gas turbine engine 10 in dependence on an output signal of the gas pressure detector 401.

In step 807, the process ends.

Embodiments are not restricted to all of the microphones 401 being located within the gas turbine engine 10. Embodiments also include one or more microphones 401 being located outside of the gas turbine engine 10. There may be microphones located both inside and outside of the gas turbine engine 10 or all of the microphones may be located outside of the gas turbine engine 10.

Embodiments may be used for detecting burst ducts in an automatic thrust pull back system. Other applications that embodiments may be used for include determining if operations are being correctly performed during a pilot shutdown operation and determining if ventilation systems, cooling systems and/or pressure relief panels are operating correctly.

When incorrect operation is detected, embodiments include automatically generating messages to maintenance teams and dispatch notes for reporting the incorrect operation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of automatically determining an operating condition of at least part of a gas turbine engine for an aircraft, the method comprising:
    measuring one or more gas pressure waves by a gas pressure detector, wherein the gas pressure detector is located in the gas turbine engine and comprises an acoustic element, and the acoustic element has a directional sensitivity; and
    automatically determining, by a computing system, an operating condition of the at least part of the gas turbine engine in dependence on an output signal of the gas pressure detector, wherein:
    the gas pressure detector comprises a plurality of acoustic elements;
    each acoustic element has directional sensitivity; and
    all of the acoustic elements have different orientations such that the gas pressure detector is able to detect gas pressure waves with substantially the same sensitivity in all of the directions that a respective acoustic element is orientated in.

2. The method according to claim 1, further comprising measuring one or more gas pressure waves by one or more further gas pressure detectors, wherein:
    the one or more further gas pressure detectors are located in the gas turbine engine; and
    said automatically determining of the operating condition is also dependent on the output signal from each of the one or more further gas pressure detectors.

3. The method according to claim 1, wherein the computing system performs a Fourier Transform on the output signal of the gas pressure detector to generate a frequency domain version of the output signal.

4. The method according to claim 1, wherein said automatically determining of the operating condition comprises comparing, by the computing system, the output signal of the gas pressure detector with one or more predetermined signals.

5. The method according to claim 4, wherein:
    the computing system performs a Fourier Transform on the output signal of the gas pressure detector to generate a frequency domain version of the output signal; and
    said comparing of the output signal of the gas pressure detector with the one or more predetermined signals is a comparison of the frequency domain version of the output signal with the one or more predetermined signals.

6. The method according to claim 1, further comprising filtering, by the computing system, the output signal of the gas pressure detector.

7. The method according to claim 1, further comprising:
    monitoring, by the computing system, the operating condition of the at least part of the gas turbine engine; and detecting, by the computing system, a change in the operating condition.

8. The method according to claim 7, further comprising determining, by the computing system, a type of the change in the operating condition of the at least part of the gas turbine engine in dependence on comparison of the output signal of the gas pressure detector with one or more predetermined signals.

9. The method according to claim 8, wherein:
the determined type of the change includes a pipe cracking, bursting and/or leaking; and/or
the determined type of the change comprises a type of pipe that a change has occurred in, including at least one of a cabin air pipe, anti-ice air pipe or handling bleed pipe.

10. The method according to claim 7, further comprising determining a location of the change.

11. The method according to claim 10, further comprising measuring one or more gas pressure waves by one or more further gas pressure detectors, wherein:
the one or more further gas pressure detectors are located in the gas turbine engine;
said automatically determining of the operating condition is also dependent on the output signal from each of the one or more further gas pressure detectors; and
the location of the change is determined in dependence on a difference in time of arrival of gas pressure waves received at two or more of the gas pressure detectors.

12. The method according to claim 1, wherein the acoustic elements are arranged to form a substantially spherical shape such that the sensitivity of the gas pressure detector is substantially the same in all directions around the gas pressure detector.

13. The method according to claim 1, wherein:
each acoustic element comprises an acoustic sensor and a housing; and
the housing is a horn wave guide.

14. The method according to claim 1, wherein the gas pressure detector is located in a fire zone of the gas turbine engine.

15. The method according to claim 1, further comprising impacting the gas turbine engine,
wherein the automatically determining of the operating condition of the at least part of the gas turbine engine is dependent on one or more gas pressure waves caused by the impact.

16. A system comprising a gas turbine engine for an aircraft and a computing system, wherein:
the gas turbine engine comprises one or more gas pressure wave detectors; and
the computing system is arranged to automatically detect the operating condition of the at least part of the gas turbine engine according to the method of claim 1.

17. The system according to claim 16, wherein the gas turbine engine further comprises:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft.

18. The system according to claim 17, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

19. A gas pressure detector comprising:
a plurality of acoustic elements, wherein sensitivity of detection of a gas pressure wave by each acoustic element is dependent on a direction that the acoustic element is aligned in relative to a direction of propagation of the gas pressure wave,
wherein:
all of the acoustic elements have different orientations such that the gas pressure detector is able to detect gas pressure waves with substantially the same sensitivity in all of the directions that an acoustic element is orientated in; and
the acoustic elements are arranged to form a substantially spherical shape such that the sensitivity of the gas pressure detector is substantially the same in all directions around the gas pressure detector.

20. The gas pressure detector according to claim 19, wherein:
each acoustic element comprises an acoustic sensor and a horn wave guide;
the acoustic element is arranged at a first end of the horn wave guide; and
a second end of the horn wave guide, that is opposite the first end of the horn wave guide, is shaped as a polygon in a cross-section that is orthogonal to a longitudinal axis of the horn wave guide.

21. The gas pressure detector according to claim 19, wherein the acoustic elements are arranged such that a shape of the gas pressure detector is a dodecahedron.

* * * * *